US011284437B2

(12) United States Patent
Su et al.

(10) Patent No.: US 11,284,437 B2
(45) Date of Patent: Mar. 22, 2022

(54) ON-DEMAND SYSTEM INFORMATION REQUEST PROCEDURES FOR NEW RADIO (NR)

(71) Applicant: Apple Inc., Cupertino, CA (US)

(72) Inventors: Li Su, San Jose, CA (US); Sethuraman Gurumoorthy, San Jose, CA (US); Muthukumaran Dhanapal, Dublin, CA (US)

(73) Assignee: Apple Inc., Cupertino, CA (US)

( * ) Notice: Subject to any disclaimer, the term of this patent is extended or adjusted under 35 U.S.C. 154(b) by 31 days.

(21) Appl. No.: 16/225,163

(22) Filed: Dec. 19, 2018

(65) Prior Publication Data
US 2019/0268943 A1 Aug. 29, 2019

Related U.S. Application Data
(60) Provisional application No. 62/634,751, filed on Feb. 23, 2018.

(51) Int. Cl.
*H04W 74/08* (2009.01)
*H04W 56/00* (2009.01)
(52) U.S. Cl.
CPC ..... *H04W 74/0833* (2013.01); *H04W 56/001* (2013.01)
(58) Field of Classification Search
CPC ..... H04W 48/10; H04W 48/12; H04W 48/14; H04W 74/004; H04W 74/006; H04W 74/0833; H04W 76/27
(Continued)

(56) References Cited

U.S. PATENT DOCUMENTS

2010/0002590 A1* 1/2010 Park ............... H04W 74/006
370/241
2015/0011213 A1* 1/2015 Lou ............... H04W 48/12
455/436
(Continued)

FOREIGN PATENT DOCUMENTS

CN 101064728 A 10/2007
CN 101175309 A 5/2008
(Continued)

OTHER PUBLICATIONS

SAMSUNG; "Other system information delivery"; R1-1710631; 3GPP TSG RAN WG1 NR Ad-Hoc#2; Qingdao, P.R. China; Jun. 27-30, 2017; 4 pages.
(Continued)

*Primary Examiner* — Harun Chowdhury
(74) *Attorney, Agent, or Firm* — Kowert, Hood, Munyon, Rankin & Goetzel, P.C.

(57) ABSTRACT

A device (e.g. a wireless communication device) may determine, according to a set of guidelines, a list that includes system information to be requested by the device as part of a system information request procedure. The device may determine whether to combine the system information request with an additional request associated with a random access procedure (RACH). In response to determining that the requests are to be combined, the device may initiate a unified RACH that combines the system information request and the additional request. The decision to combine the requests may be based on the type of the additional request, whether the list has been completed by the time the additional request is to be issued, and/or additional factors associated with wireless communications of the device. The system information request may be an OnDemand system
(Continued)

information block request, and the RACH may be contention-based or contention-free.

20 Claims, 5 Drawing Sheets

(58) Field of Classification Search
USPC .......................... 370/241, 252, 329; 455/436
See application file for complete search history.

(56) References Cited

U.S. PATENT DOCUMENTS

| | | |
|---|---|---|
| 2016/0234794 A1 | 8/2016 | Xu et al. |
| 2017/0111886 A1 | 4/2017 | Kiim |
| 2018/0049107 A1* | 2/2018 | Johansson ............. H04W 48/10 |
| 2018/0270868 A1 | 9/2018 | Ou |
| 2018/0279377 A1 | 9/2018 | Lin |
| 2019/0261421 A1* | 8/2019 | Peisa ................. H04W 74/0833 |
| 2019/0394807 A1* | 12/2019 | Xiao ..................... H04W 76/27 |
| 2020/0015265 A1* | 1/2020 | Zhang ................... H04W 48/10 |

FOREIGN PATENT DOCUMENTS

| | | |
|---|---|---|
| CN | 101945479 A | 1/2011 |
| CN | 102158981 A | 8/2011 |
| CN | 102474884 A | 5/2012 |
| CN | 105264983 A | 1/2016 |
| CN | 106465428 A | 2/2017 |

OTHER PUBLICATIONS

First Office Action for CN Patent Application No. 201910130839.X; dated Sep. 27, 2021.
ZTE et al. "Unified RACH procedure"; 3GPP TSG RAN WG1 Meeting #87 R1-1611273; Reno, USA; Nov. 14-18, 2016.
ZTE et al. "Random Access in NR"; 3GPP TSG RAN WG1 Meeting #96 R2-167831; Reno, USA; Nov. 14-18, 2016.

* cited by examiner

ON-DEMAND SYSTEM INFORMATION REQUEST PROCEDURES FOR NEW RADIO (NR)

PRIORITY CLAIM

This application claims benefit of priority of U.S. Provisional Patent Application Ser. No. 62/634,751 titled "On-Demand System Information Request Procedures for New Radio (NR)", filed on Feb. 23, 2018, which is hereby incorporated by reference as though fully and completely set forth herein.

FIELD OF THE INVENTION

The present application relates to wireless communications and wireless communication devices, and more particularly to on-demand system information block (SIB) request procedures for 5G/New Radio (NR) communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), BLUETOOTH™, etc. The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications.

3GPP Long Term Evolution (LTE) has become the technology of choice for the majority of wireless network operators worldwide, providing mobile broadband data and high-speed Internet access to their subscriber base. However, a next telecommunications standard has been being proposed to move beyond the current International Mobile Telecommunications-Advanced (IMT-Advanced) Standards. This new standard is called 5th generation mobile networks or 5th generation wireless systems, referred to as 3GPP NR (otherwise known as 5G-NR for 5G New Radio, also simply referred to as NR). NR proposes a higher capacity for a higher density of mobile broadband users, also supporting device-to-device, ultra-reliable, and massive machine communications, as well as lower latency and lower battery consumption, than current LTE standards.

When switched on, a UE typically begins searching for the network. There is a possibility that there are many networks, or many frequencies from different network operators available for the UE to connect to. Therefore, the UE needs to synchronize to each frequency and determine to which of those frequencies to connect. The UE performs this by undergoing an initial synchronization process. Once the UE has completed the synchronization process, it begins to use various system information to establish wireless communications with (in) the network. LTE system information includes the Master Information Block (MIB) and a number of System Information Blocks (SIBs). The MIB is broadcast on the Physical Broadcast Channel (PBCH), while SIBs are sent on the Physical Downlink Shared Channel (PDSCH) through Radio Resource Control (RRC) messages (i.e. via RRC messaging/signaling). An SI message can contain one or several SIBs.

The MIB is the initial system information used by the UE once the UE has achieved downlink synchronization, and carries the most essential information that is needed for the UE to acquire other information from the cell. The various different SIBs (LTE includes five different types of SIBs, SIB1-SIB5) carry various ones of the remaining information needed by the UE to conduct wireless communications in the cell.

LTE system information (SI) is transmitted in the broadcast control logical channel (BCCH). Generally, BCCH messages are carried on the Downlink Shared Channel (DL-SCH) and transmitted on the Physical Downlink Shared Channel (PDSCH) in conjunction with a downlink control information (DCI) message transmitted on the Physical Downlink Control Channel (PDCCH) that indicates format and resource allocation of the PDSCH transmission. SI-RNTI, the Radio Network Temporary Identity (RNTI) of the system information, scrambles this DCI message. The exception is the initial system information conveyed in the master information block (MIB), which, as mentioned above, is carried on the BCH transport channel and transmitted on the PBCH.

Once the SIBs (at least SIB1 and SIB2) have been read, the UE performs a random access procedure (RACH) to initiate data transfer with (in) the network. At this stage, there may be many other UEs in the same area (same cell) performing similar procedures, in which case there is a possibility of collision among the requests coming from various other UEs. Such a RACH is referred to as a contention-based RACH. However, a network can inform a UE to use a unique identity to prevent its request from colliding with requests coming from other UEs. Such a RACH is referred to as contention-free RACH or non-contention-based RACH. A contention-free RACH is performed for an intra-system handover request, or a synchronization request for downlink data transfer (upon losing synchronization during downlink data transfer). A contention-based RACH is performed for moving from a radio resource control (RRC) Idle state to an RRC connected state, a synchronization request for uplink data transfer (upon losing synchronization during uplink data transfer), or an RRC connection reestablishment request.

The overall functionality and structure of the MIB/SIB in NR is almost the same as it is in LTE, but there are differences. For example, in LTE (and in most technologies other than NR), the SIBs are broadcast periodically regardless of whether or not a UE requests SIBs. However, NR differentiates between two different types/group of SIBs. A first type/group of SIBs, or initial SIBs are transmitted periodically like SIBs in LTE (referred to as No-OnDemand SI indication), while additional SIBs are transmitted as requested by the UE (this is referred to as OnDemand SI indication).

As presently set forth in the 3GPP NR specification, OnDemand SIBs are requested by the UE through a RACH. The coordination of contention-based/contention-free RACH with the OnDemand SIB request procedure is not standardized and is therefore left up to implementation. It is desirable to efficiently coordinate contention-based/contention-free RACH with the OnDemand SIB request procedure to obtain efficient operation and power use of the UE.

Other corresponding issues related to the prior art will become apparent to one skilled in the art after comparing such prior art with the disclosed embodiments as described herein.

SUMMARY OF THE INVENTION

Embodiments described herein relate to a User Equipment (UE) device, base station, and/or relay station, and associated method(s) for coordinating and/or combining an OnDemand system information (SI) request (also referred to as OnDemand SIB request) with other requests associated with a random access procedure (RACH—e.g. contention-based RACH and/or contention-free RACH) for power saving and efficient operation of a UE during wireless communications, e.g. during 5G-NR (NR) wireless communications and transmissions.

In some embodiments, a UE may follow specific guidelines to determine a list of SI (System Information, or System Information Blocks—SIBs) to be indicated (requested) as part of an OnDemand SIB request procedure. If the UE detects at least a specified number of native (and strong) NR (5G) cells in the vicinity, then it may not request SI related to inter-RAT measurements. On the other hand, if the UE detects that the NR (5G) inter frequency cells are weak, then it may begin requesting SI related to inter-RAT neighbors. The UE may first request SI related to 4G inter-RAT neighbor measurements. If, based on a specified number of discontinuous reception (DRX) cycles of 4G measurements, the UE determines that the 4G inter RAT neighbor cells do not meet a specified set of measurement criteria, it may request SI for 3G and 2G neighbor cells. In this manner, taking into account the mobility of the UE as well as the measurement status of current neighbor cells, the UE may adaptively construct the list of OnDemand SI related to measurements.

In some embodiments, if the UE supports a certain feature or group of features, and there is an indication of an intent to enable such feature(s), for example from a user and/or application, then the UE may add the SI related to those feature(s) in the OnDemand SI request procedure. For example, the UE may support Evolved Multimedia Broadcast Multicast Services (eMBMS), and an indication to enable eMBMS may lead to enabling eMBMS, allowing a user to subscribe to multicast services.

Upon completion of a mobility procedure, the UE may request OnDemand SIBs that include SI which may be a function of a previous serving cell's additional SI and/or a function of the current serving cell's details in the UE's databases, e.g. SIB DB, ACQ DB, measurement DB and/or feature DB (e.g. a list of features supported by the current cell in the past, or previously supported by the current cell).

Once the UE has determined the list of SI to be requested as part of the OnDemand SIB request procedure, it may combine request(s) associated with a RACH (whether contention-based or contention-free) with the OnDemand SIB Request an initiate a single unified RACH that include the OnDemand SIB Request and an additional request. The UE may determine whether to combine the requests based at least on the nature/type of the other requests, whether the list of SI to be requested during the OnDemand SIB Request procedure has been completed, and/or additional factors associated with wireless communications of the UE.

For example, if the UE is about to initiate a connection establishment procedure (RACH) for low-priority background data, and the UE hasn't yet determined the (complete or final) list of SI to be requested as part of the OnDemand SI (SIB) request procedure, then the connection establishment RACH may be delayed by a specified duration, e.g. until the UE has determined the list of SIs to be requested as part of the OnDemand SI request procedure. The UE may then combine the OnDemand SIB request with the connection establishment request (for low-priority) data in a contention-based unified RACH. In other words, the OnDemand SIB (or SI) Request procedure may be included as part of the contention-based connection establishment request RACH.

In another example, if the UE is about to initiate a connection establishment procedure (RACH) for high-priority data, and the UE has not yet determined the (complete or final) list of SI to be requested as part of the OnDemand SI request procedure, then the connection establishment request may not be combined with the OnDemand SIB (or SI) request, which enables the UE to issue the request for high-priority data as soon as possible. The UE may thereby initiate a RACH for the connection establishment request for high-priority data, and once the UE has determined the list of SI to be requested, it may initiate a separate (or new) RACH for the OnDemand SIB (or SI) request once the UE has entered a radio resource control (RRC) Connected state.

In yet another example, if the UE needs to initiate an OnDemand SIB request procedure and scheduling requests (SRs) issued by the UE keep failing, but the number of failed SR attempts hasn't reached a specified number (e.g. a maximum number of SR attempts) by the time the UE has determined the list of SI (or SIBs) to be requested as part of the OnDemand SIB Request procedure, then instead of waiting any further, the UE may initiate an early unified RACH. The unified RACH may combine the OnDemand SIB request with a synchronization request as a contention-free RACH to synchronize the UE with the network. Similarly, for an uplink (UL) Out-of-Sync procedure (RACH), the UE may initiate an early unified RACH combining the OnDemand SIB request with a synchronization request in a contention-based RACH to synchronize the UE with the network.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

ACK: Acknowledge
ARQ: Automatic Repeat Request (also: Automatic Repeat Query)
BPSK: Binary Phase-Shift Keying
BS: Base Station
CCE: Control Channel Elements
CFI: Control format Indicator
CQI: Channel Quality Indicator
CRC: Cyclic Redundancy Check
DCI: Downlink Control Information
DL: Downlink (from BS to UE)
DL-SCH: Downlink Shared Channel
FDD: Frequency Division Duplexing
FEC: Forward Error Correction
GPS: Global Positioning System
GSM: Global System for Mobile Communication
HARQ: Hybrid Automatic Repeat Request
LTE: Long Term Evolution
MAC: Media Access Control (layer)
MIMO: Multiple-In Multiple-Out
NACK: Negative Acknowledge
NW: Network
OFDM: Orthogonal Frequency-Division Multiplexing
PCFICH: Physical Control Format Indicator Channel
PDCCH: Physical Downlink Control Channel
PDSCH: Physical Downlink Shared Channel
PDU: Protocol Data Unit
PHICH: Physical HARQ Indicator Channel
PUSCH: Physical Uplink Shared Channel
PHY: Physical (Layer)
QPSK: Quadrature Phase-Shift Keying
REG: Resource Element Group
RNTI: Radio Network Temporary Identifiers
RRC: Radio Resource Control
RSRP: Reference Signal Received Power
RSSI: Reference Signal Strength Indicator
RX: Reception
SINR: Signal-To-Interference-Plus-Noise Ratio
TB: Transport Blocks
TDD: Time Division Duplexing
TTI: Transmission Time Interval
TX: Transmission
UE: User Equipment
UL: Uplink (from UE to BS)
ULSCH: Uplink Shared Channel
UMTS: Universal Mobile Telecommunication System

Terms

The following is a glossary of terms that may appear in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which perform wireless communications. Also referred to as wireless communication devices, many of which may be mobile and/or portable. Examples of UE devices include mobile telephones or smart phones (e.g., iPhone™, Android™-based phones) and tablet computers such as iPad™, Samsung Galaxy™, etc., gaming devices (e.g. Sony Play Station™, Microsoft XBox™, etc.), portable gaming devices (e.g., Nintendo DS™, PlayStation Portable™, Gameboy Advance™, iPod™), laptops, wearable devices (e.g. Apple Watch™, Google Glass™), PDAs, portable Internet devices, music players, data storage devices, or other handheld devices, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable/mobile.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing one or more functions in a device, e.g. in a user equipment device or in a cellular network device, and/or cause the user equipment device or cellular network device to perform one or more functions. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

DCI—refers to downlink control information. There are various DCI formats used in LTE in PDCCH (Physical Downlink Control Channel). The DCI format is a predefined format in which the downlink control information is packed/formed and transmitted in PDCCH.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 1:
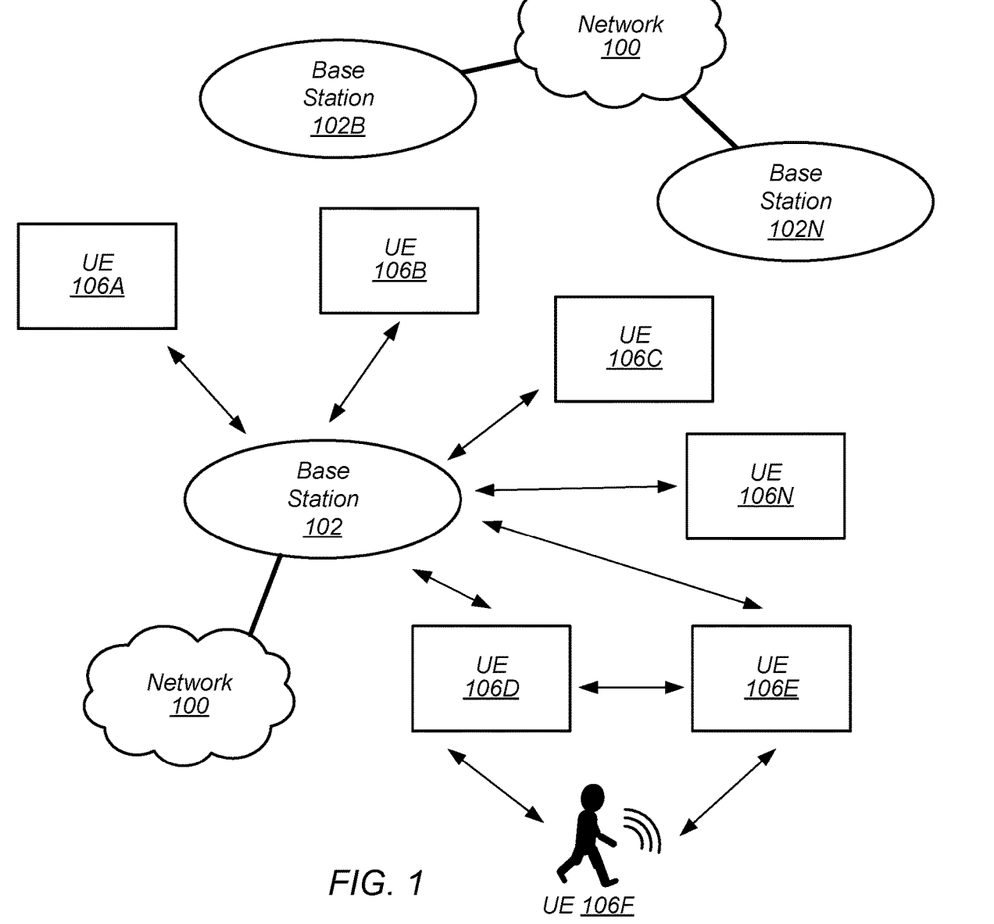
FIG. 1 illustrates an exemplary (and simplified) wireless communication system according to some embodiments.
Figure 2:
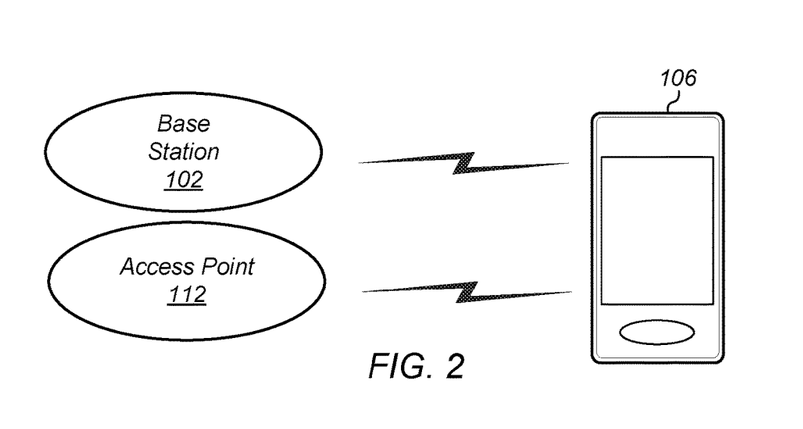
FIG. 2 illustrates a base station in communication with a wireless user equipment (UE) device according to some embodiments.

FIGS. 1 and 2—Exemplary Communication Systems

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106A, 106B, etc., through 106N. Each of the user devices may be referred to herein as a "user equipment" (UE) or UE device. Thus, the user devices 106 are referred to as UEs or UE devices. Furthermore, when referring to an individual UE in general, user devices are also referenced herein as UE 106 or simply UE. Various ones of the UE devices may coordinate and/or combine system information requests (e.g. an OnDemand SIB requests) with other requests associated with a random access procedure, e.g. contention-based RACH and/or contention-free RACH, for power saving and efficient operation of the UE during wireless communications, e.g. during 5G-NR (NR) wireless communications and transmissions, according to various embodiments disclosed herein.

The base station 102 may be a base transceiver station (BTS) or cell site, and may include hardware that enables wireless communication with the UEs 106A through 106N. The base station 102 may also be equipped to communicate with a network 100, e.g., a core network of a cellular service provider, a telecommunication network such as a public switched telephone network (PSTN), and/or the Internet, neutral host or various CBRS (Citizens Broadband Radio Service) deployments, among various possibilities. Thus, the base station 102 may facilitate communication between the user devices and/or between the user devices and the network 100. The communication area (or coverage area) of the base station may be referred to as a "cell." It should also be noted that "cell" may also refer to a logical identity for a given coverage area at a given frequency. In general, any independent cellular wireless coverage area may be referred to as a "cell". In such cases a base station may be situated at particular confluences of three cells. The base station, in this uniform topology, may serve three 120 degree beam width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads). As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network, and may further also be considered at least a part of the UE communicating on the network or over the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G-NR (NR, for short), 3GPP2 CDMA2000 (e.g., 1×RTT, 1×EV-DO, HRPD, eHRPD), Wi-Fi, WiMAX etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'. In some embodiments, the base station 102 communicates with at least one UE that coordinates and/or combines system information requests (e.g. an OnDemand SIB requests) with other requests associated with a random access procedure, e.g. contention-based RACH and/or contention-free RACH, for power saving and efficient operation of a UE during wireless communications, e.g. during 5G-NR (NR) wireless communications and transmissions, according to various embodiments disclosed herein. Depending on a given application or specific considerations, for convenience some of the various different RATs may be functionally grouped according to an overall defining characteristic. For example, all cellular RATs may be collectively considered as representative of a first (form/type of) RAT, while Wi-Fi communications may be considered as representative of a second RAT. In other cases, individual cellular RATs may be considered individually as different RATs. For example, when differentiating between cellular communications and Wi-Fi communications, "first RAT" may collectively refer to all cellular RATs under consideration, while "second RAT" may refer to Wi-Fi. Similarly, when applicable, different forms of Wi-Fi communications (e.g. over 2.4 GHz vs. over 5 GHz) may be considered as corresponding to different RATs. Furthermore, cellular communications performed according to a given RAT (e.g. LTE or NR) may be differentiated from each other on the basis of the frequency spectrum in which those communications are conducted. For example, LTE or NR communications may be performed over a primary licensed spectrum as well as over a secondary spectrum such as an unlicensed spectrum.

Overall, the use of various terms and expressions will always be clearly indicated with respect to and within the context of the various applications/embodiments under consideration.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

As mentioned above, UE 106 may be capable of communicating using multiple wireless communication standards. For example, a UE 106 might be configured to communicate using any or all of a 3GPP cellular communication standard (such as LTE or NR) or a 3GPP2 cellular communication standard (such as a cellular communication standard in the CDMA2000 family of cellular communication standards). In some embodiments, the UE 106 may be configured to communicate with base station 102 using methods of coordinating and/or combining a system information (SI) request with another request associated with a random access procedure to issue a single, unified random access procedure, as described herein. Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, BLUETOOTH™, BLUETOOTH™ Low-Energy, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible. Furthermore, the UE 106 may also communicate with Network 100, through one or more base stations or through other devices, stations, or any appliances not explicitly shown but considered to be part of Network 100. UE 106 communicating with a network may therefore be interpreted as the UE 106 communicating with one or more network nodes considered to be a part of the network and which may interact with the UE 106 to conduct communications with the UE 106 and in some cases affect at least some of the communication parameters and/or use of communication resources of the UE 106.

Furthermore, as also illustrated in FIG. 1, at least some of the UEs, e.g. UEs 106D and 106E may represent vehicles communicating with each other and with base station 102, e.g. via cellular communications such as 3GPP LTE and/or 5G-NR communications, for example. In addition, UE 106F may represent a pedestrian who is communicating and/or interacting with the vehicles represented by UEs 106D and 106E in a similar manner.

FIG. 2 illustrates an exemplary user equipment 106 (e.g., one of the devices 106-A through 106-N) in communication with the base station 102 and an access point 112, according to some embodiments. The UE 106 may be a device with both cellular communication capability and non-cellular communication capability (e.g., BLUETOOTH™, Wi-Fi, and so forth) such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antenFnas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1×RTT or NR, and separate radios for communicating using each of Wi-Fi and BLUETOOTH™. Other configurations are also possible.

Figure 3:
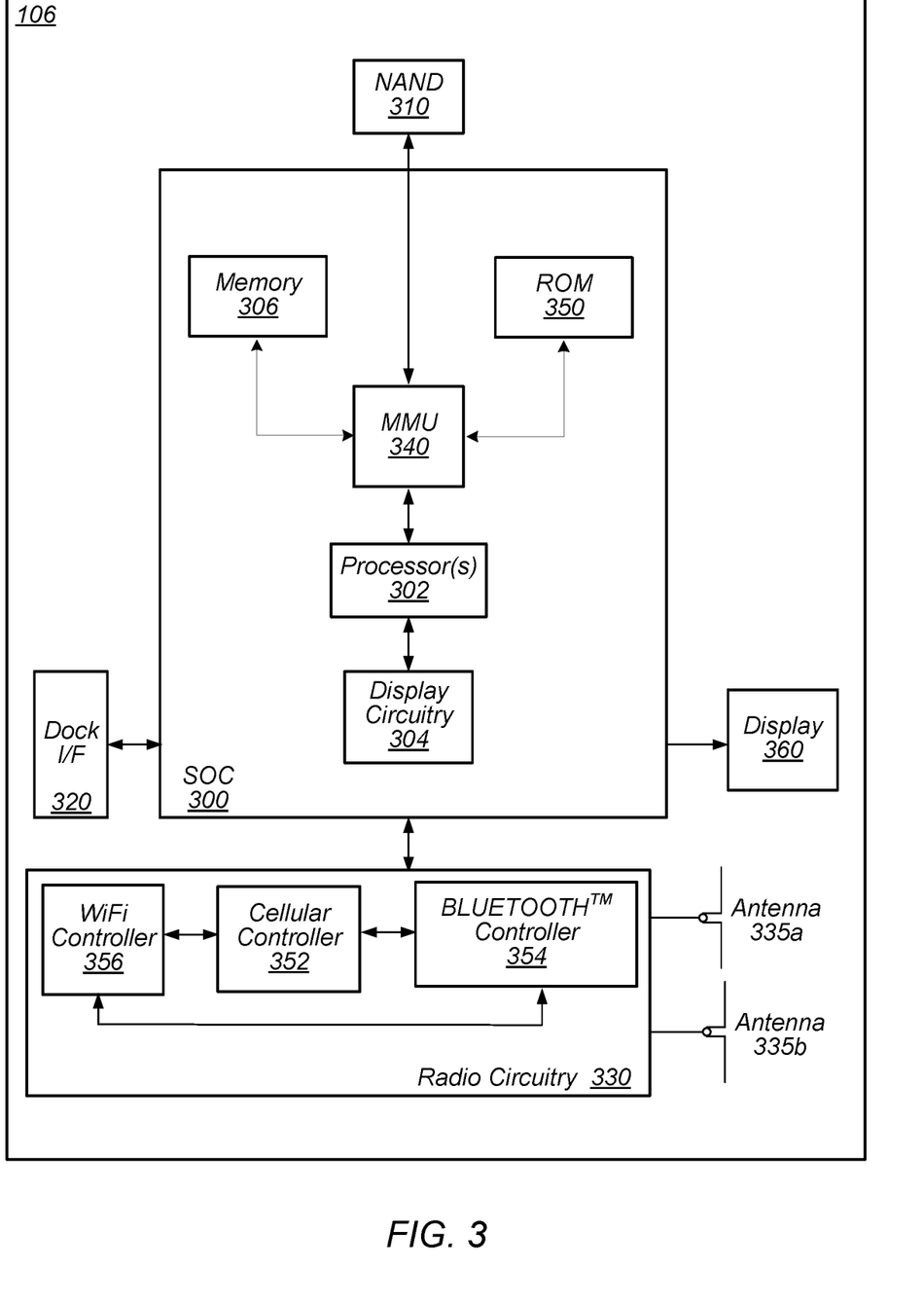
FIG. 3 illustrates an exemplary block diagram of a UE, according to some embodiments.

FIG. 3—Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, NR, CDMA2000, BLUETOOTH™, Wi-Fi, GPS, etc.). The UE device 106 may include at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

As further described herein, the UE 106 (and/or base station 102) may include hardware and software components for implementing a method for coordinating and/or combining a system information request with another request associated with a random access procedure to issue a single, unified random access procedure during wireless communications, e.g. 5G-NR (NR) communications, according to various embodiments disclosed herein. The processor(s) 302 of the UE device 106 may be configured to implement part or all of the methods of coordinating and/or combining a system information request with another request associated with a random access procedure to issue a single, unified random access procedure during wireless communications described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Specifically, processor(s) 302 may be coupled to and/or may interoperate with other components as shown in FIG. 3, to implement communications by UE 106 that coordinate and/or combine a system information request with another request associated with a random access procedure to issue a single, unified random access procedure during wireless communications. Processor(s) 302 may also implement various other applications and/or end-user applications running on UE 106.

Figure 5:
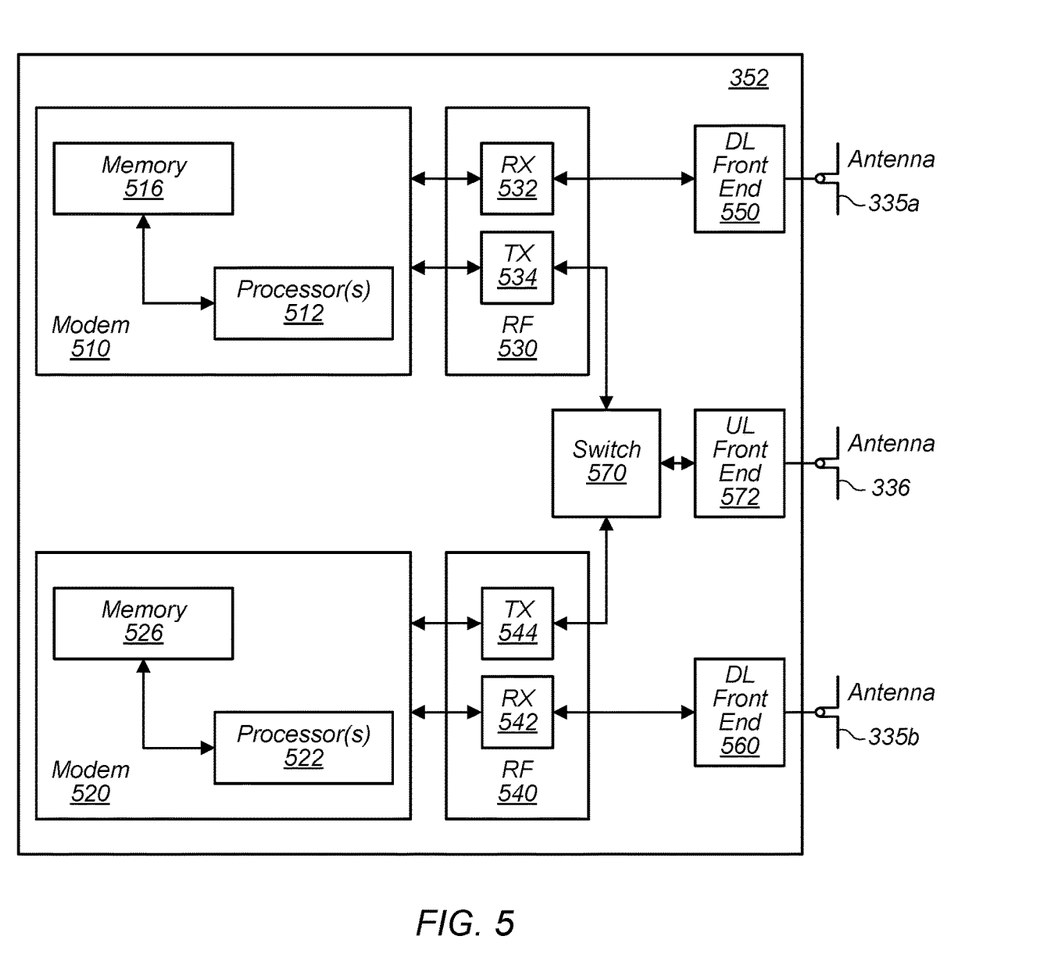
FIG. 5 shows an exemplary simplified block diagram illustrative of cellular communication circuitry, according to some embodiments.

In some embodiments, radio circuitry 330 may include separate controllers dedicated to controlling communications for various respective RAT standards. For example, as shown in FIG. 3, radio circuitry 330 may include a Wi-Fi controller 356, a cellular controller (e.g. LTE and/or NR controller) 352, and BLUETOOTH™ controller 354, and in at least some embodiments, one or more or all of these controllers may be implemented as respective integrated circuits (ICs or chips, for short) in communication with each other and with SOC 300 (and more specifically with processor(s) 302). For example, Wi-Fi controller 356 may communicate with cellular controller 352 over a cell-ISM link or WCI interface, and/or BLUETOOTH™ controller 354 may communicate with cellular controller 352 over a cell-ISM link, etc. While three separate controllers are illustrated within radio circuitry 330, other embodiments have fewer or more similar controllers for various different RATs that may be implemented in UE device 106. For example, at least one exemplary block diagram illustrative of some embodiments of cellular controller 352 is shown in FIG. 5 as further described below.

Figure 4:
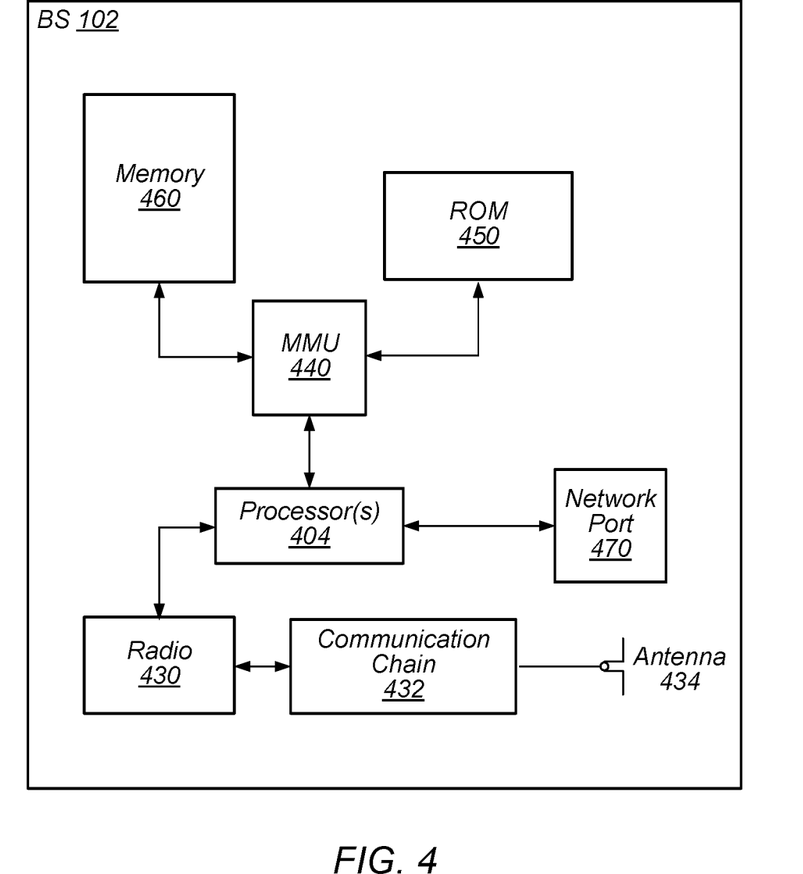
FIG. 4 illustrates an exemplary block diagram of a base station, according to some embodiments.

FIG. 4—Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be designed to communicate via various wireless telecommunication standards, including, but not limited to, LTE, LTE-A, 5G-NR (or NR for short), WCDMA, CDMA2000, etc. The processor(s) 404 of the base station 102 may be configured to implement part or all of the methods described herein, e.g., by executing program instructions stored on a memory medium (e.g., a non-transitory computer-readable memory medium), for base station 102 to communicate with a UE device in a manner consistent with embodiments of a system information request coordinated and/or combined with another request associated with a random access procedure to issue a single, unified random access procedure during wireless communications as disclosed herein. Alternatively, the processor(s) 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Overall, the various components (460, 450, 440, 404, 430, 432, 470 and 434) of BS 102 may interoperate to enable the BS 102 to communicate with UEs initiating random access procedures at least according to the various embodiments disclosed herein.

FIG. 5—Exemplary Cellular Communication Circuitry

FIG. 5 illustrates an exemplary simplified block diagram illustrative of cellular controller 352, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 352 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 352 may couple (e.g., communicatively; directly or indirectly) to one or more antennas, such as antennas 335a-b and 336 as shown. In some embodiments, cellular communication circuitry 352 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 352 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 352 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 352 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 352 may include only one transmit/receive chain. For example, the cellular communication circuitry 352 may not include the modem 520, the RF front end 540, the DL front end 560, and/or the antenna 335b. As another example, the cellular communication circuitry 352 may not include the modem 510, the RF front end 530, the DL front end 550, and/or the antenna 335a. In some embodiments, the cellular communication circuitry 352 may also not include the switch 570, and the RF front end 530 or the RF front end 540 may be in communication, e.g., directly, with the UL front end 572.

Coordinating Random Access Procedure with OnDemand System Information Block Request As previously mentioned, in a proposed transition to NR (or 5G-NR) communications, an OnDemand system information (SI) request (also referred to as OnDemand SIB request) may be coordinated and/or combined with other request(s) associated with a random access procedure (RACH), either with a contention-based RACH or a contention-free RACH, to achieve power savings and efficient operation of the UE. Typically, a RACH may be performed for specific scenarios that include:

- Initial access by a UE (e.g. when the UE is trying to access the network in RRC idle state);
- An RRC connection reestablishment procedure (e.g. including transmission of an RRC connection reestablishment message);
- A handover (e.g. handing over communications of the UE from one base station to another base station);
- When uplink synchronization is lost (e.g. when the network has not received uplink data from the UE for a certain time duration or during a time period of specified length);
- When the UE does not have any Physical Uplink Control Channel (PUCCH) resources available for a Scheduling Request (SR); and/or
- When timing advance is needed for positioning the UE while in an RRC connected state.

For requesting system information, a UE may follow certain procedures and/or criteria in determining a list of SI (or SIBs) to request during an OnDemand SIB Request procedure. The UE may also determine based on specified criteria how to coordinate and in some cases combine the OnDemand SIB Request procedure with another request associated with a RACH in order to initiate a single unified RACH for a more efficient and less power consuming operation.

Figure 6:
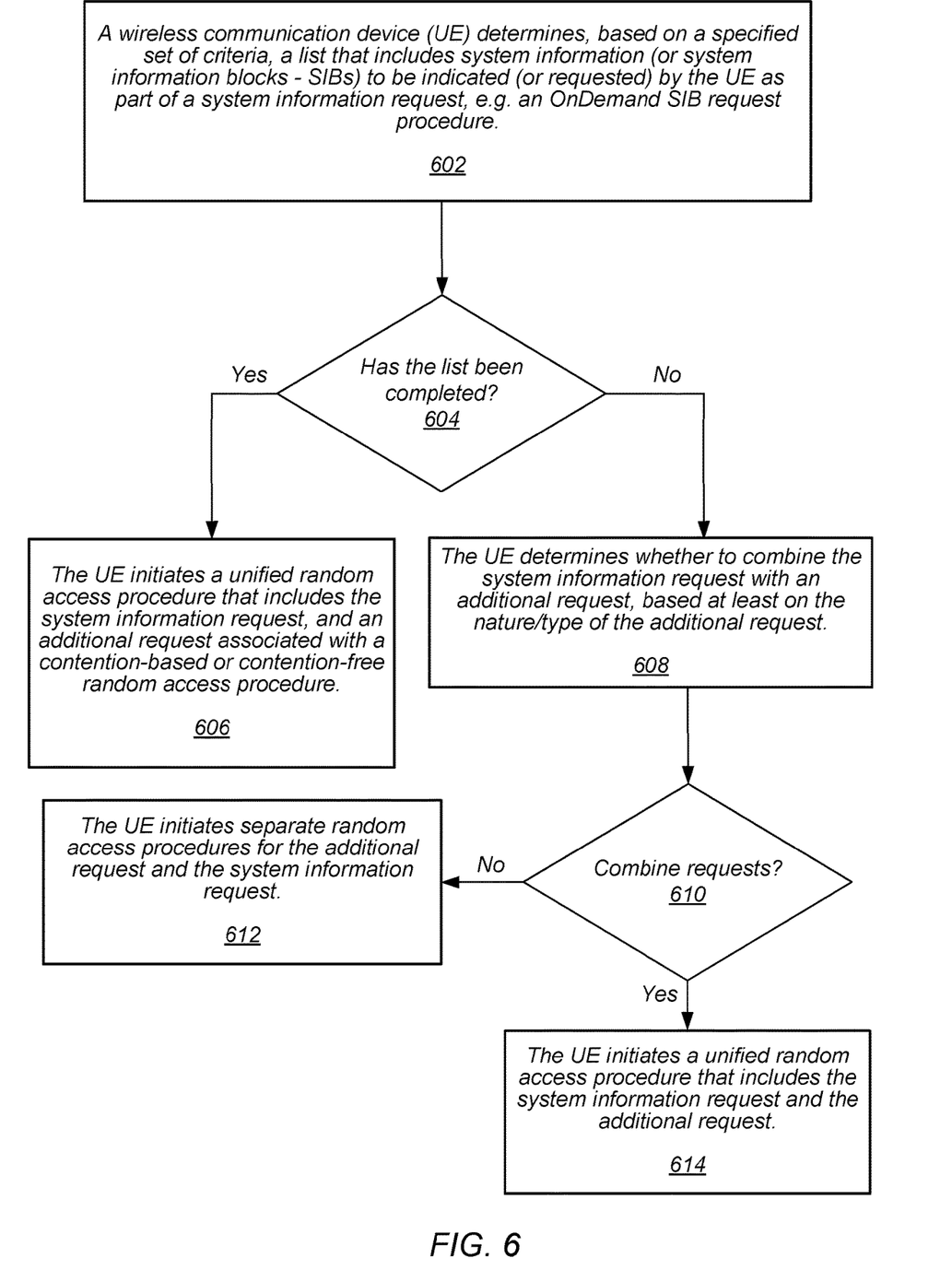
FIG. 6 shows an exemplary flow diagram illustrating how a UE may coordinate requests associated with a random access procedure (RACH) with an OnDemand System Information (Block) Request, according to some embodiments.

FIG. 6 shows an exemplary flow diagram illustrating how a UE may coordinate various requests associated with a random access procedure (RACH) with and OnDemand SIB Request, according to some embodiments. The RACH may be contention-based or contention-free. As opposed to issuing "blind" requests, the UE may determine how to issue OnDemand SIB Requests and initiate contention-based and/or contention-free RACHs based on a variety of criteria/parameters, such that the UE consumes less power and operates more efficiently.

As illustrated in FIG. 6, a device, e.g. a wireless communication device (UE) may determine, based on a specified set of criteria and/or according to a set of guidelines, a list that includes system information (or system information blocks—SIBs) to be indicated (or requested) by the UE as part of a system information request, e.g. an OnDemand SIB request procedure (602). The system information request may be part of (or included in) a random access procedure (RACH) initiated by the UE. If the list has been completed ("Yes" taken at 604), the UE may initiate a unified RACH that includes the system information request, and an additional request associated with a contention-based or contention-free RACH (606). If the list has not been completed ("No" taken at 604), the UE may determine, based at least on the additional request (or nature/type of the additional request), whether to combine the system information request with the additional request (608). For example, the UE may determine that it cannot wait to complete the list before initiating a RACH for the additional request, in which case the UE does not combine the requests ("No" taken at 610), initiate a RACH for the additional request, and initiate a separate RACH for the system information request once the list is complete (512). On the other hand, if the UE determines that it can wait for the list to be completed before issuing the additional request (or before initiating a RACH that includes the additional request), the UE may combine the requests ("Yes" taken at 610), and initiate a unified RACH that includes both the system information request and the additional request (514). The nature/type of the additional requests (e.g. connection establishment request for high-priority data, connection establishment request for low-priority data, synchronization request for downlink, synchronization request for uplink, etc.) and/or additional factors associated with wireless communications of the UE may have a bearing on the decision when to combine requests, as will be further detailed below with respect to various exemplary embodiments illustrated by way of a number of different use cases.

Determining the List of SI (SIBs) to be Requested During an OnDemand SIB Request Procedure In some embodiments, a UE may follow certain specific guidelines to determine a list of SI (System Information, or System Information Blocks—SIBs) to be indicated or requested as part of an OnDemand SIB request procedure. For example, if the UE detects a (large) number of native (and strong) cells of a first, preferred RAT, e.g. NR (5G-NR) cells in the vicinity, then it may not request SI related to inter RAT measurements. On the other hand, if the UE detects that the inter frequency cells of the first, preferred RAT, e.g. NR (5G-NR) inter frequency cells are weak, then it may begin requesting SI related to inter-RAT neighbors. In such cases the UE may first request SI related to inter-RAT neighbor measurements associated with a second RAT, e.g. a 4G RAT. For example, the UE may first request SI related to 4G inter-RAT neighbor measurements. If, based on a specified number of discontinuous reception (DRX) cycles of measurements associated with the second RAT, e.g. based on a specified number of DRX cycles of 4G measurements, the UE determines that the second RAT, e.g. 4G inter RAT neighbor cells do not meet a specified set of measurement criteria, it may request SI for a third RAT (e.g. 3G) and/or fourth RAT (e.g. 2G) neighbor cells. In this manner, taking into account the mobility of the UE as well as the measurement status of current neighbor cells, the UE may adaptively construct the list of OnDemand SI (to request) related to measurements.

In some embodiments, if the UE supports a certain feature or group of features, and there is an indication of an intent to enable such feature(s), for example from a user and/or application, then the UE may add the SI related to those feature(s) in the OnDemand SI request. For example, the UE may support Evolved Multimedia Broadcast Multicast Services (eMBMS), and an indication to enable eMBMS may lead to enabling eMBMS, allowing a user to subscribe to multicast services.

Upon completion of a mobility procedure, the UE may request OnDemand SIBs that include SI which may be a function of a previous serving cell's additional SI and/or a function of the current serving cell's details in the UE's databases (DBs), e.g. SIB DB, ACQ DB (acquisition DB), measurement DB and/or feature DB (e.g. a list of features supported by the current cell in the past, or previously supported by the current cell).

Combining Random Access Procedure with OnDemand System Information Block Request Once the UE has determined the list of SI to be requested as part of the OnDemand SIB request procedure, it may combine other request(s) associated with a RACH (whether contention-based or contention-free) with the OnDemand SIB Request in order to initiate a unified RACH. In other words, the UE may coordinate the OnDemand SIB Request procedure with the RACH, and once the UE has determined which SIBs (or which SI) to request, for example as discussed above, it may combine the OnDemand SIB Request procedure with a contention-based RACH and/or contention-free RACHs, and initiate a unified RACH as opposed to initiating a RACH for an OnDemand SIB Request and initiating a separate contention-based or contention-free RACH for another (additional) request associated with a RACH.

The following represent examples of some requests associated with a RACH, e.g. requests that may be issued as part of a RACH, which may be considered together with an OnDemand SIB Request.

If the UE intends to initiate a connection establishment RACH for low-priority background data, and the UE hasn't yet determined the (complete or final) list of SI to be requested as part of the OnDemand SI (SIB) request, then the connection establishment RACH may be delayed by a specified duration, e.g. until the UE has determined the list of SIs to be requested as part of the OnDemand SI request. The UE may then combine the OnDemand SIB Request with the connection establishment (request) RACH, which is a contention-based RACH. In other words, the OnDemand SIB (or SI) Request may be included as part of the contention-based RACH that also includes the connection establishment request, with the UE initiating a single unified RACH.

If the UE intends to initiate a connection establishment RACH for high-priority data, and the UE has not yet determined the (complete or final) list of SI to be requested as part of the OnDemand SI request procedure, then UE may not combine the connection establishment request with the OnDemand SIB (or SI) request to enable the UE to issue the request for high-priority data as soon as possible. Thus, the UE may initiate the RACH for the connection establishment request for the high-priority data, and once the UE has determined the list of SI to be requested in the OnDemand SIB Request, it may initiate a separate (or new) RACH for the OnDemand SIB (or SI) request once the UE has entered a radio resource control (RRC) Connected state.

If the UE needs to initiate an OnDemand SIB request procedure and scheduling requests (SRs) issued by the UE keep failing, but the number of failed SR attempts hasn't reached a specified number (e.g. a maximum number of SR attempts) by the time the UE has determined the list of SI (or SIBs) to be requested as part of the OnDemand SIB request, then instead of waiting any further, the UE may initiate an early unified RACH. The unified RACH may combine the OnDemand SIB request with a synchronization request in a contention-free RACH to synchronize the UE with the network. Similarly, for an uplink (UL) Out-of-Sync procedure, the UE may initiate an early unified RACH combining the OnDemand SIB request with a synchronization request in a contention-based RACH to synchronize the UE with the network.

According to at least the above, and as also shown in FIG. 6, a device may determine, according to a set of guidelines or criteria, a list of system information to be requested as part of a system information request procedure. The device may also determine whether to combine the system information request with an additional request associated with a random access procedure, and may initiate a unified random access procedure that includes the system information request and the additional request, in response to determining that the system information request and the additional request are to be combined. The device may determine whether to combine the system information request with the additional request based on a type of the additional request, and/or whether the list has been completed by a specified point in time at which the device is to issue the additional request.

Furthermore, the device may initiate a first random access procedure for the additional request and a second random access procedure for the system information request, in response to determining that the system information request and the additional request are not to be combined. The first random access procedure may be initiated before the second random access procedure, with the device issuing the second random access procedure once the device is in a radio resource control connected state. The device may determine that the system information request and the additional request are not to be combined in response to the additional request including a connection establishment request for high-priority data, and the list not being completed by a specified point in time at which the device is to issue the connection establishment request. In such cases, the device may initiate the first random access procedure for the connection establishment request and may initiate the second random access procedure for the system information request after initiating the first random access procedure, once the list has been completed and the device is in a radio resource control connected state.

In some embodiments, the device may determine that the system information request and the additional request are to be combined in response to the additional request including a connection establishment request for low-priority data. The device may consequently delay initiating the unified random access procedure with respect to a first point in time at which the device is to issue the connection establishment request, in response to the list not having been completed by the first point in time, but may initiate the unified random access procedure as soon as the list has been completed. Alternatively, the device may determine that the system information request and the additional request are to be combined in response to the additional request including a synchronization request and the number of unsuccessful scheduling requests issued by the device not reaching a specified number. The device may also determine that the system information request and the additional request are to be combined in response to the additional request including a synchronization request associated with an uplink out-of-sync procedure. The system information request may include and OnDemand system information block request, and the random access procedure may be a contention-based random access procedure or a contention-free random access procedure.

In some embodiments, the set of guidelines used in determining the list of system information may include instructions not to include, in the list, system information related to cells operating according to RATs different from a first RAT, in response to at least a specified number of cells operating at or above a specified power level according to the first RAT located in vicinity of the device. The set of guidelines may further include instructions to include, in the list, system information related to neighboring cells operating according to RATs different from the first RAT, in response to cells operating according to a first RAT in the vicinity of the device not operating at or above the specified power level. Finally, the set of guidelines may include instructions to include, in the list, system information related to one or more specific features that are supported by the device and are intended to be used. The system information may include additional system information relating to a previous serving cell and details stored in one or more databases of the device and relating to a current serving cell.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus comprising:
a memory element configured to store information; and
a processor configured to use at least a part of the information to cause a device to:
determine, according to a set of guidelines, system information to request as part of a system information request, and add the system information to a list;
determine whether to combine the system information request with an additional request associated with a random access procedure, based at least in part on whether the list has been completed by a specified point in time at which the device is to issue the additional request; and
initiate a unified random access procedure that includes the system information request and the additional request, in response to determining that the system information request and the additional request are to be combined.

2. The apparatus of claim 1, wherein the processor is configured to further cause the device to determine whether to combine the system information request with the additional request further based on:
a type of the additional request.

3. The apparatus of claim 1, wherein the processor is configured to further cause the device to initiate a first random access procedure for the additional request and a second random access procedure for the system information request, in response to determining that the system information request and the additional request are not to be combined.

4. The apparatus of claim 3, wherein the processor is configured to further cause the device to initiate the first random access procedure before initiating the second random access procedure.

5. The apparatus of claim 3, wherein the processor is configured to further cause the device to issue the second random access procedure once the device is in a radio resource control connected state.

6. The apparatus of claim 1, wherein the processor is configured to further cause the device to determine that the system information request and the additional request are not to be combined in response to:
the additional request comprising a connection establishment request for high-priority data; and
the list not having been completed by the specified point in time.

7. The apparatus of claim 6, wherein the processor is configured to further cause the device to:
initiate a first random access procedure for the connection establishment request; and
initiate a second random access procedure for the system information request after initiating the first random access procedure, once the list has been completed and the device is in a radio resource control connected state.

8. The apparatus of claim 1, wherein the processor is configured to further cause the device to:
determine that the system information request and the additional request are to be combined in response to the additional request comprising a connection establishment request for low-priority data; and
delay initiating the unified random access procedure, in response to the list not having been completed by the specified point in time.

9. The apparatus of claim 8, wherein the processor is configured to further cause the device to:
initiate the unified random access procedure as soon as the list has been completed.

10. The apparatus of claim 1, wherein the processor is configured to further cause the device to determine that the system information request and the additional request are to be combined in response to:
the additional request comprising a synchronization request; and
a number of unsuccessful scheduling requests issued by the device not reaching a specified number.

11. The apparatus of claim 1, wherein the processor is configured to further cause the device to determine that the system information request and the additional request are to be combined in response to the additional request comprising a synchronization request associated with an uplink out-of-sync procedure.

12. The apparatus of claim 1, wherein the system information request comprises an OnDemand system information block request.

13. The apparatus of claim 1, wherein the random access procedure is one of:
a contention-based random access procedure; or
a contention-free random access procedure.

14. The apparatus of claim 1, wherein the set of guidelines comprises one or more of the following:

instruction not to include system information related to cells operating according to radio access technologies (RATs) different from a first RAT, in response to at least a specified number of cells operating at or above a specified power level according to the first RAT located in vicinity of the device;

instruction to include system information related to neighboring cells operating according to RATs different from the first RAT, in response to cells operating according to a first RAT in the vicinity of the device not operating at or above the specified power level; or instruction to include system information related to one or more specific features that are supported by the device and are intended to be used.

15. The apparatus of claim 1, wherein the system information comprises:

additional system information relating to a previous serving cell; and information stored in one or more databases of the device and relating to a current serving cell.

16. A device comprising:

radio circuitry configured to facilitate wireless communications of the device over a wireless network; and a processor communicatively coupled to the radio circuitry and configured to cause the device to:

determine, according to a set of criteria, system information to request as part of a system information request, and add the system information to a list;

determine whether to combine the system information request with an additional request associated with a random access procedure, based at least in part on whether the list has been completed by a specified point in time at which the device is to issue the additional request; and initiate a unified random access procedure that includes the system information request and the additional request, in response to determining that the system information request and the additional request are to be combined.

17. The device of claim 16, wherein the processor is configured to further cause the device to initiate a first random access procedure for the additional request and a second random access procedure for the system information request, in response to determining that the system information request and the additional request are not to be combined.

18. The device of claim 16, wherein the processor is configured to further cause the device to:

determine that the system information request and the additional request are not to be combined in response to:

the additional request comprising a connection establishment request for high priority data; and the list not having been completed by the specified point in time;

initiate a first random access procedure for the connection establishment request; and initiate a second random access procedure for the system information request after initiating the first random access procedure, once the list has been completed and the device is in a radio resource control connected state.

19. A non-transitory memory element storing instructions executable by a processor to cause a device to:

determine, according to a set of criteria, system information to request as part of a system information request, and add the system information to a list;

determine whether to combine the system information request with an additional request associated with a random access procedure, based at least in part on whether the list has been completed by a specified point in time at which the device is to issue the additional request; and initiate a unified random access procedure that comprises the system information request and the additional request, in response to determining that the system information request and the additional request are to be combined.

20. The non-transitory memory element of claim 19, wherein the instructions are executable by the processor to further cause the device to initiate a first random access procedure for the additional request and a second random access procedure for the system information request, in response to determining that the system information request and the additional request are not to be combined.

* * * * *